C. KUGLER.

Improvement in Furnace-Grates.

No. 5,014. Reissued July 30, 1872.

Witnesses
John A. Ellis.
Wm K. Ellis

Charles Kugler Inventor
Per
C. H. Watson & Co.
Attys.

UNITED STATES PATENT OFFICE.

CHARLES KUGLER, OF BARNESVILLE, OHIO, ASSIGNOR, BY MESNE ASSIGNMENTS, TO JOHN W. STANTON, ALLEN J. ALEXANDER, JOHN F. DAVIS, AND JONATHAN T. SCOFIELD, OF SAME PLACE.

IMPROVEMENT IN FURNACE-GRATES.

Specification forming part of Letters Patent No. 126,060, dated April 23, 1872; reissue No. 5,014, dated July 30, 1872.

*To all whom it may concern:*

Be it known that I, CHARLES KUGLER, of Barnesville, in the county of Belmont and State of Ohio, have invented certain new and useful Improvements in Furnace-Grates; and I do hereby declare that the following is a full, clear, and exact description thereof, reference being had to the accompanying drawing and to the letters of reference marked thereon, which form a part of this specification.

My invention is intended as an improvement upon the improvements in furnace-grates for which Letters Patent of the United States were granted to John W. Stanton, of Barnesville, Ohio, bearing date the 13th day of February, 1872. The first part of my invention relates to the form and construction of the grate-bar; and consists in making the bar in two separate sections, as hereinafter described, and so combining them as to form the bar with air-space in its center lengthwise. The second part of my invention relates to the use of bearing-bars crosswise of the grate-bars, so constructed and arranged, in combination with stationary bars placed parallel with the grate-bars, as to both sustain the grate and furnish the practical and efficient means of oscillating the alternate grate-bars in opposite directions at the same time, giving to each a compound motion, and so effectually agitating the grate as to remove all ashes from the fire, together with such unburnable material as can pass through the openings in the grate. The third part of my invention relates to the use of stationary bars placed in the furnace parallel with the grate-bars, in combination with the cross bearing-bars, on which the grate-bars rest, as a means of supporting the grate. The apparatus is thus made complete in itself, and can be readily introduced into any ordinary furnace without change in the construction of the furnace.

Figure 1:
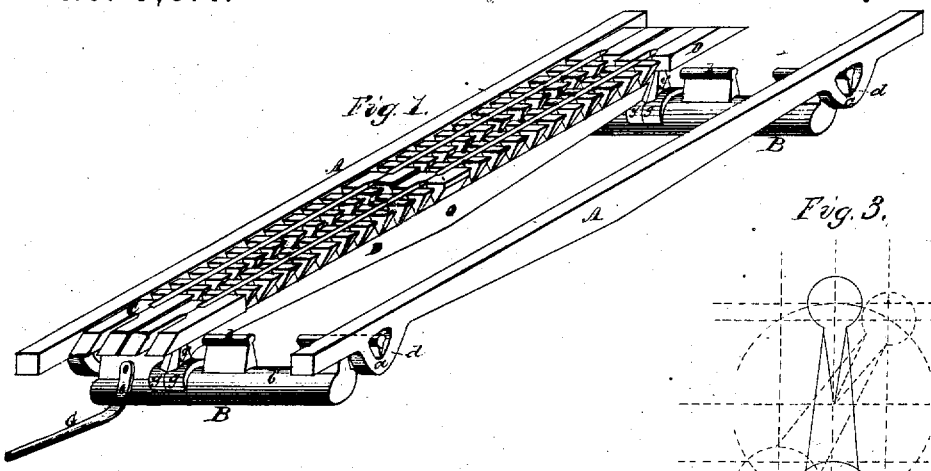
Figure 3:
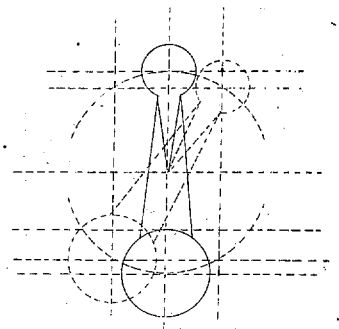
Figure 2:
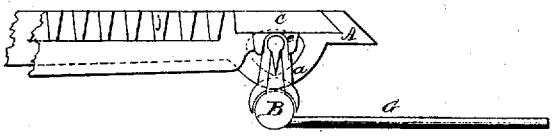
Figure 7:
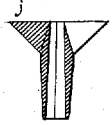
Figure 4:
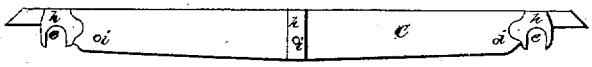
Figure 5:
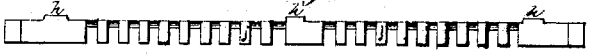
Figure 6:
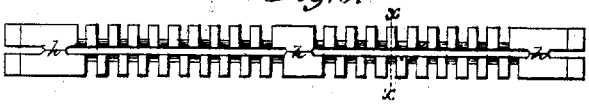

Figure 1 is a perspective view of my improved grate, a part of the bars being removed the better to show the arrangement of its several parts. Fig. 2 shows in section the relative position of the grate to its supports. Fig. 3 is an enlarged end view of the pivoted bearing-bar—two positions shown. Fig. 4 gives a view of the inside or plain side of a section of the bar. Fig. 5 is a top view of the same. Fig. 6 is a top view of the complete bar. Fig. 7 shows a cross section of the bar through the dotted line *x*.

A is a stationary bar of any convenient form, having openings *a a*, stirrups, or other similar device to form bearings for the pivots *d* of the bar B. B is the cross bearing-bar, provided with V-shaped pivots *d d*, placed in bearings *a a* so as to allow it to oscillate freely. It is so constructed as to form a series of cranks, *b b'*, which are the rests for the grate-bars C D, Fig. 1. C D, Fig. 1, are the grate-bars, and are each formed by combining two parallel sections secured together at *i i i*. Each section is formed on the inside upon a downward and slightly outward projecting line having the projections *h h h* for the purpose of forming the central air-course parallel with the bar. The outside of each section is formed upon an outward incline down to the base of the fire-supporting projections *j*, which are placed all on one side of the section, and from that point inclines inward to the bottom of said section, leaving the top sharp, being formed of an acute angle, while the bottom of the section may be made of any desired thickness by varying the outside downward incline. In and near the ends of C are semicircular boxes *e e* to rest upon the crank *b*, while D has near its ends downward-projecting arms, *f f*, with similar boxes, *g g*, at their ends, to rest upon the crank *b'* of the pivoted bearing-bar B, and so on alternating until said bearing-bar is filled, forming a complete series of grate-bars, which will all be on a level when the bearing-bars hang in their normal position. The pivoted cross bearing-bars B sustain the grate-bars C D, independent of any other support, and are operated by the lever G.

I do not claim the projections or fire-supports, for I am aware that they are not new; but,

Having thus fully described my invention, what I claim as new, and desire to secure by Letters Patent, is—

1. The section of the bar C, with the fire-supports *j* all on one side of the rib, constructed and arranged substantially as and for the purpose herein set forth.

2. The section of the bar C, with the fire-supports *j* all on one side of the rib, and used in connection with another section of reverse construction to form a bar having a central air-space, constructed and arranged substantially as and for the purpose set forth.

3. The pivoted oscillating supporting-bar B having the bearings for the grate-bars on different arcs of a circle, with its pivot at a point between the arcs to give the compound motion, substantially as and for the purpose herein specified.

4. The stationary bars A, placed in the furnace parallel to the grate-bars C D to furnish a support for the oscillating grate and bar B, substantially as and for the purpose described.

CHARLES KUGLER.

Witnesses:

WASHINGTON THORNBERRY,

N. J. MANNING.